(12) United States Patent
Buesing

(10) Patent No.: US 10,843,751 B2
(45) Date of Patent: Nov. 24, 2020

(54) AUTOMATICALLY MOVING FLOOR PROCESSING DEVICE WITH AN ADJUSTING LEVER

(71) Applicant: Vorwerk & Co. Interholding GmbH, Wuppertal (DE)

(72) Inventor: Hannes Buesing, Aachen (DE)

(73) Assignee: Vorwerk & Co. Interholding GmbH, Wuppertal (DE)

( * ) Notice: Subject to any disclaimer, the term of this patent is extended or adjusted under 35 U.S.C. 154(b) by 211 days.

(21) Appl. No.: 16/111,476

(22) Filed: Aug. 24, 2018

(65) Prior Publication Data
US 2019/0061846 A1 Feb. 28, 2019

(30) Foreign Application Priority Data

Aug. 25, 2017 (DE) .......................... 10 2017 119 591

(51) Int. Cl.
*B62D 57/02* (2006.01)
*A47L 9/00* (2006.01)
*G05D 1/02* (2020.01)

(52) U.S. Cl.
CPC .............. *B62D 57/02* (2013.01); *A47L 9/009* (2013.01); *A47L 2201/00* (2013.01); *G05D 1/021* (2013.01); *G05D 2201/0215* (2013.01)

(58) Field of Classification Search
CPC ...... A47L 9/009; A47L 11/24; A47L 11/4011; A47L 11/4036; A47L 11/4061; A47L 11/4066; A47L 11/4072; A47L 2201/00; B62D 57/02; G05D 1/021; G05D 2201/0215
USPC ....................... 180/8.1, 8.2, 8.3, 218; 280/5.2
See application file for complete search history.

(56) References Cited

U.S. PATENT DOCUMENTS

| 7,017,687 | B1 * | 3/2006 | Jacobsen | ................ | B62D 57/02 180/8.3 |
| 8,998,215 | B2 * | 4/2015 | Windorfer | ................ | A47L 9/009 280/5.2 |
| 2009/0194955 | A1 * | 8/2009 | Kakinuma | ........... | B62K 11/007 280/5.2 |

FOREIGN PATENT DOCUMENTS

EP   2 743 038 B1   2/2017

* cited by examiner

*Primary Examiner* — Jacob D Knutson
*Assistant Examiner* — Felicia L. Brittman
(74) *Attorney, Agent, or Firm* — Collard & Roe, P.C.

(57) ABSTRACT

An automatically moving floor processing device has a housing and an adjusting lever that can be displaced relative to the housing for overcoming an obstacle, wherein the adjusting lever has a base body and a contact area for contacting the obstacle to be overcome, and wherein the adjusting lever is mounted so that it can eccentrically swivel on a wheel of the floor processing device on the one hand and on the housing on the other. In order to further optimize the process of overcoming obstacles, the contact area can be displaceable relative to the base body of the adjusting lever, specifically pivotably mounted on an axis of the base body.

8 Claims, 4 Drawing Sheets

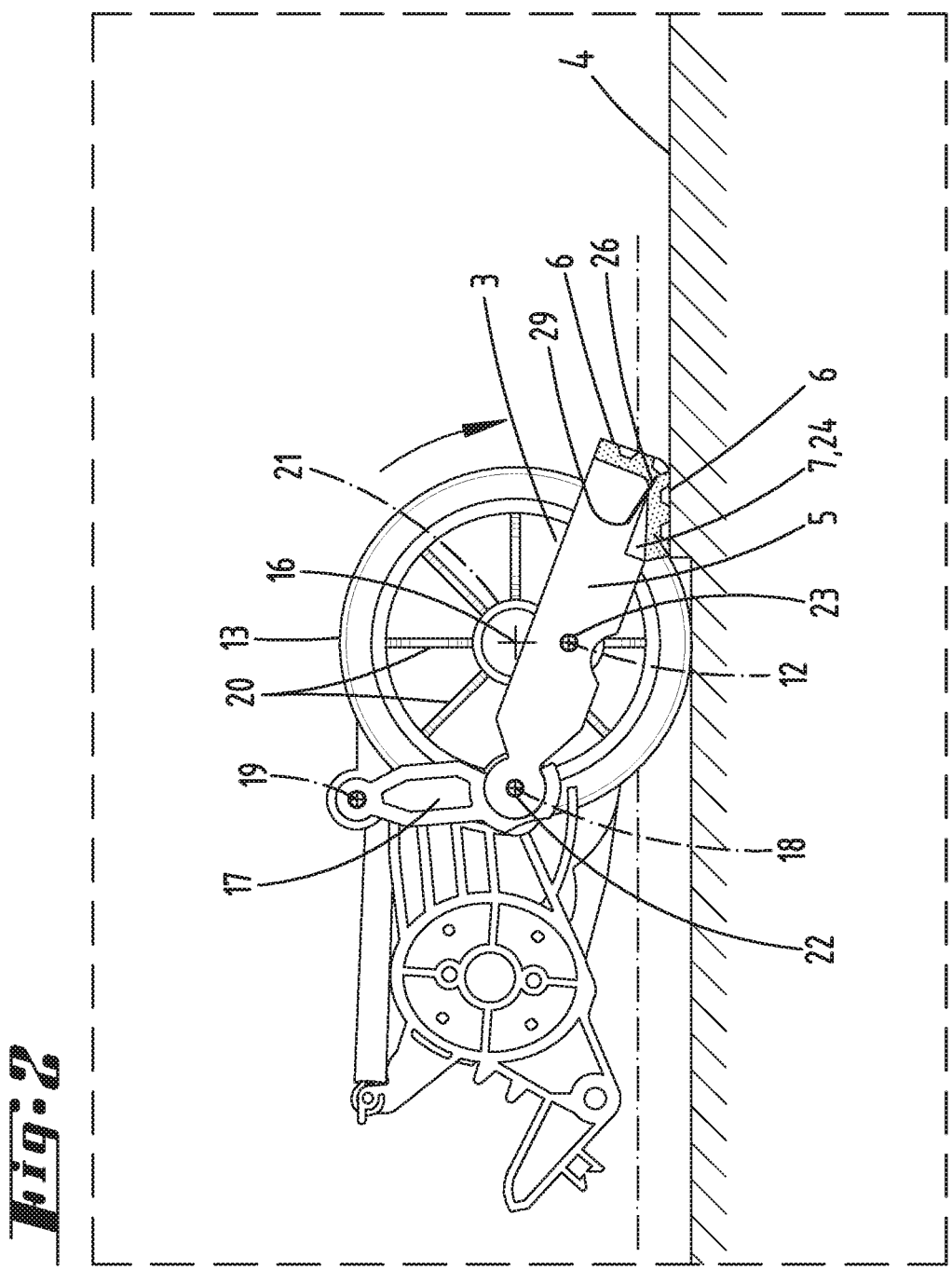

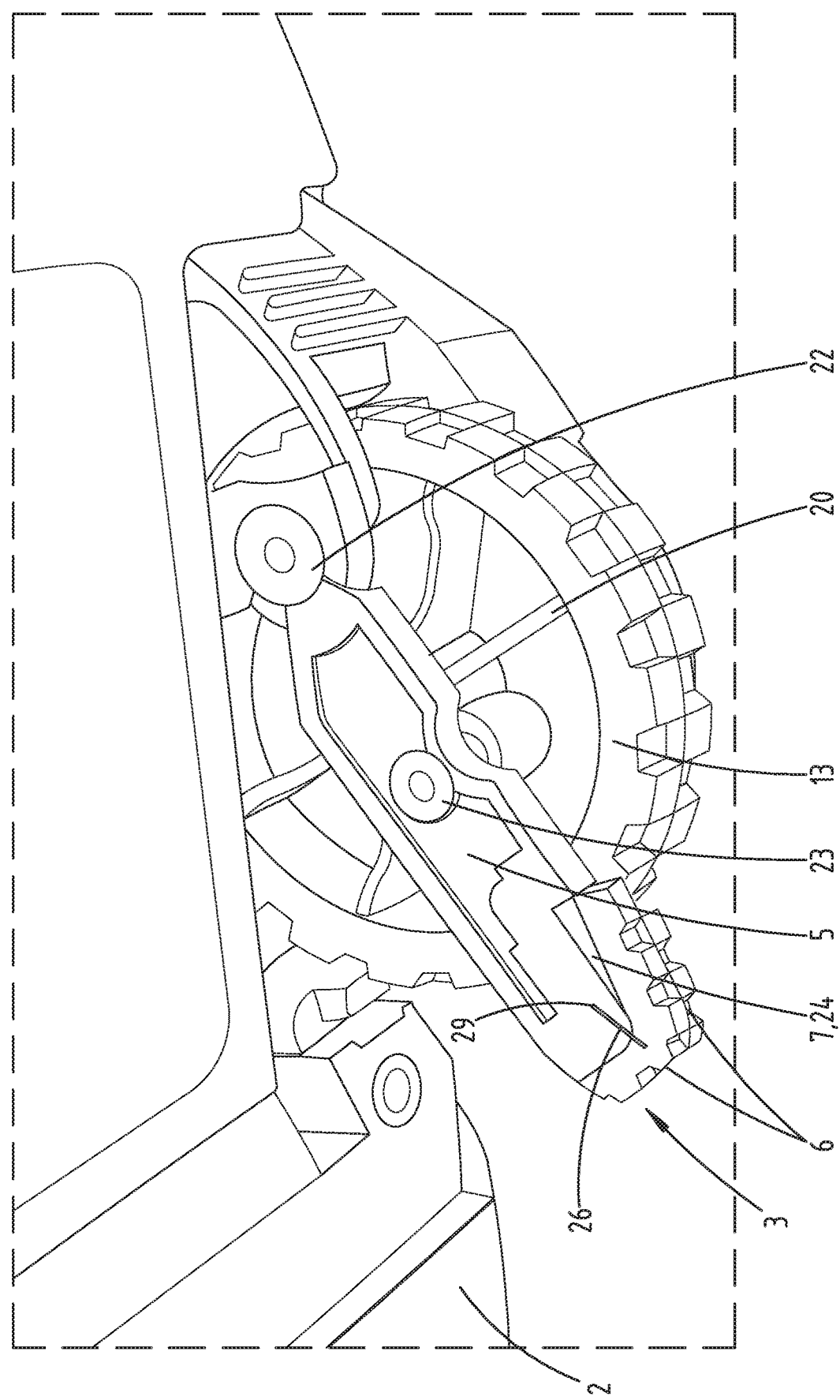

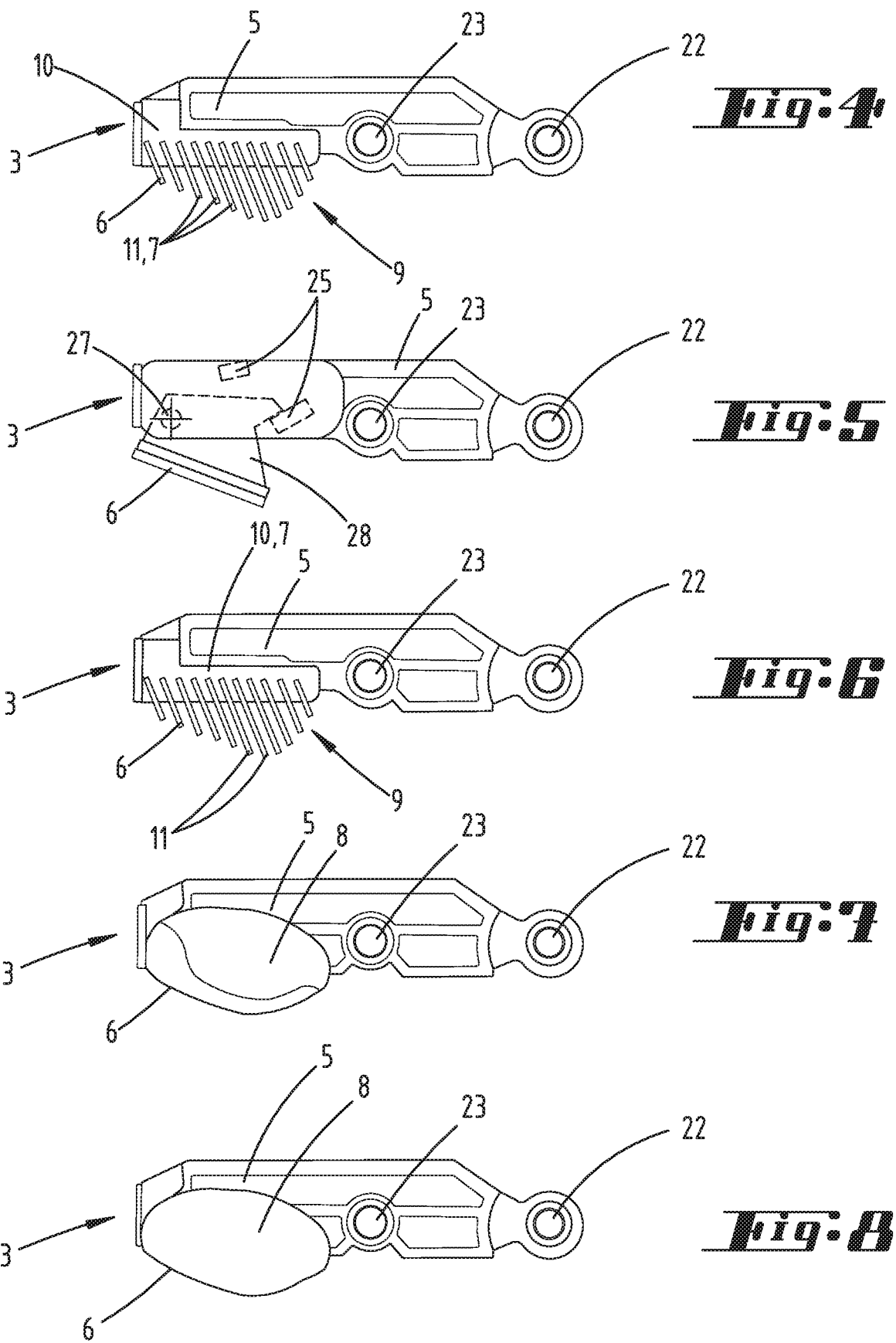

AUTOMATICALLY MOVING FLOOR PROCESSING DEVICE WITH AN ADJUSTING LEVER

CROSS REFERENCE TO RELATED APPLICATIONS

Applicant claims priority under 35 U.S.C. § 119 of German Application No. 10 2017 119 591.2 filed on Aug. 25, 2017, the disclosure of which is incorporated by reference.

BACKGROUND OF THE INVENTION

1. Field of the Invention

The invention relates to an automatically moving floor processing device with a housing and an adjusting lever that can be displaced relative to the housing for overcoming an obstacle, wherein the adjusting lever has a base body and a contact area for contacting the obstacle to be overcome, and wherein the adjusting lever is mounted so that it can eccentrically swivel on a wheel of the floor processing device on the one hand and on the housing on the other.

2. Description of the Related Art

Automatically moving floor cleaning devices are known in prior art, for example as mobile floor processing robots for vacuuming, wiping, polishing, mowing, and the like.

For example, patent specification EP 2 743 038 B1 discloses a floor cleaning device with driven wheels for automatically moving the floor cleaning device on a surface to be cleaned. In order to allow the floor cleaning device to also automatically traverse obstacles near the floor having a small height, for example up to 20 mm, the floor cleaning device has an adjusting lever, which is mounted so that it can eccentrically swivel on a wheel on the one hand and on the housing of the floor processing device on the other, so that the adjusting lever has various positions and orientations relative to the wheel and housing of the floor cleaning device given different rotational positions of the wheel, and can thereby support itself against an obstacle during a wheel rotation, for example a door threshold.

In order to increase the friction between the adjusting lever and obstacle to be overcome, it is provided that a contact area of the adjusting lever have a slip-resistant configuration to frictionally or non-positively interact with the obstacle, for example a profiling or tooth system. It is further proposed that a soft material be used, for example soft rubber or soft plastic.

SUMMARY OF THE INVENTION

Even though the aforementioned adjusting levers have proven themselves in practice for automatically traversable floor cleaning devices, the object of the invention is to further improve the adjusting levers, in particular so as to increase the probability that an obstacle will be overcome, in particular at speeds of 0.1 m/s or less.

In order to achieve this object, it is proposed that the contact area be displaceable relative to the base body of the adjusting lever, specifically pivotably mounted on an axis of the base body.

According to the invention, the relative position and orientation of the contact area on the adjusting lever can be varied, making it possible to vary an angle of the contact area, and thus also the size of a contact surface on an obstacle to be overcome. In particular, the contact surface between the contact area and the obstacle is now no longer nearly linear, but rather enlarges when the adjustment angle of the contact area relative to the obstacle moves toward zero due to the displacement of the contact area. Combined with a profiling or deformability of the contact area of the adjusting lever, the contact surface can further be adjusted. By increasing the size of the contact surface or number and size of the contact points (given a profiled contact area) between the adjusting lever and obstacle, the tensile force of the adjusting lever can be increased, which in turn increases a normal force between a wheel of the floor processing device and an edge of the obstacle, for example. This improves the climbing ability of the floor processing devices.

In particular, it is proposed that the adjusting lever have a spring element between the contact area and base body that provides a spring force. In this embodiment, the contact area is exposed to a spring force, which seeks to displace the contact area relative to the base body. For example, the spring element can be an elastic partial area of the base body and/or the contact area, or a separate spring element arranged between the contact area and the base body of the adjusting lever. If the spring element is provided by the material of the contact area or base body, for example, the latter can be made out of a rubber-elastic material, for example a cellular rubber or some other elastomer. However, it is also basically possible that the spring element be a leaf spring, leg spring, coil spring or the like, for example.

In particular, it is proposed that a restoring force of the spring element be directed toward the contact area proceeding from the base body. In this embodiment, the restoring force of the spring element displaces the contact area of the displacing lever away from the base body, with the displacing lever being otherwise unloaded. When the floor processing device stands on a surface in the usual manner, the spring element is compressed opposite its restoring force by the gravitational force of the floor processing device, which acts on the adjusting lever, so that an optimal contact pressure of the adjusting lever on an obstacle to be overcome is always present. The restoring force of the spring element acting on the obstacle thus additionally leads to an increase in the tensile force between the displacing lever and obstacle.

It is further proposed that the adjusting lever have a cushion element that can be deformed by a mechanical load between the contact area and base body. For example, the cushion element can be an air cushion, a gel cushion or also some other deformable element, which deforms under a mechanical load, in particular when exposed to the gravitational force of the floor processing device, so that the position of the contact area is displaced relative to the base body of the adjusting lever. For example, the cushion element can be movably mounted relative to the base body of the adjusting lever, and have the contact area as an integral constituent. The contact area can have material characteristics differing from those of the other partial areas of the cushion element. For example, the cushion element can have a less elastic design in the contact area than in the other partial areas. In addition, the contact area can be more resistant to mechanical loads. The base body of the adjusting lever can prescribe an expansion range for the cushion element. For example, this expansion range is limited by wall elements formed or arranged on the base body, which restrict the deformation of the cushion element in specific directions. For example, a first expansion direction can be limited by a wall, so that the cushion element expands primarily transversely thereto, specifically preferably in a direction that is oriented parallel to the surface to be processed in a usual operating position of the floor processing device. As a result, the largest possible contact surface of the cushion element is applied to a partial area of the obstacle, so that the tensile force between the adjusting lever and obstacle can be optimally increased.

In particular, it is proposed that the contact area have a flexible material. This makes it possible to apply the contact area to a partial area of the obstacle over as large a surface and as dimensionally correspondingly as possible. Especially suitable as the flexible materials are elastic materials, such as rubber.

An embodiment can provide that the contact area of the adjusting lever be an integral partial area of the cushion element or spring element, or be rigidly connected with the cushion element or spring element. A spring element is here understood as encompassing elements with resilient properties, in particular elements made out of elastic materials. Cushion elements are understood as encompassing in particular deformable elements, which need not be elastic, but can be deformed through exposure to force, such as air cushions or gel cushions. The contact area is preferably integrally designed with the cushion element or spring element. For example, the cushion element or spring element can be an injection molded part, which has different material properties in the contact area than in the remaining partial areas. If desired, the cushion element or spring element can here have two or three components. If necessary, other components are also conceivable, wherein the production outlay then rises significantly.

It is further proposed that the contact area be part of a bristle element with bristles secured to a carrier body, wherein the carrier body and/or the bristles are elastic in design, and/or the carrier body is a cushion element or spring element that can be deformed under a mechanical load. In this embodiment, the side of the adjusting lever facing toward the surface or obstacle has bristles that can be elastic, flexible or rigid in design. It is recommended that the bristle element be able to provide a contact area that can be displaced relative to the base body of the adjusting lever via the properties of the carrier body and bristles. If the bristles of the bristle elements are rigid in design, it is recommended that the carrier body have an elastic material. If the carrier body is rigid in design, the bristle elements should be elastic or at least flexible in design, so that they can optimally adapt to the shape of the obstacle surface to enlarge the contact surface. The bristle elements are especially preferably arranged on the carrier body in such a way as to be inclined or inclinable opposite the usual direction of movement of the floor processing device, and block in the opposite direction, thereby making it impossible or at least harder for the adjusting lever to slip from the obstacle. The bristles of the bristle element can be combined into bristle bundles. The bristles can each have a diameter of 0.1 mm or 0.2 mm, for example. Alternatively, the bristle element can also have thicker strips with a width of several millimeters. The bristles could be made out of plastic or natural material. The free end areas of the bristles of the bristle element comprise the contact area of the adjusting lever. If the carrier body is further designed as a deformable cushion element or spring element, the bristles could be rigid in design. The deformable carrier body then imparts deformability to the free bristle ends, i.e., the contact area.

Another embodiment proposes that the contact area be pivotably mounted on an axis of the base body. In this embodiment, for example, the contact area can be part of an element that is pivotable relative to the base body, so that the angle between the adjusting lever and obstacle can be varied. It is recommended that the pivotable partial area of the adjusting lever or contact area have allocated to it a spring element, which presses the partial area or contact area in the direction of the surface of the obstacle.

It can also be advantageous that the spring element be an elastic wedge arranged between the base body and contact area. In this embodiment, the contact area can be spaced apart from the base body, thereby yielding a wedge-shaped area between the contact area and base body, into which a likewise wedge-shaped spring element can be clamped. The spring element ensures that the angle between the contact area and base body is altered when exposed to the weight of the floor processing device or given floor contact with the adjusting lever. The pivotability of the contact area proposed as advantageous also ensures that a force transmission line is present on the adjusting lever. As a result, the force generated between the adjusting lever and obstacle can be transmitted, and a pivot point can be provided for the contact surface between the adjusting lever and obstacle. The elastic wedge can preferably be made out of an elastomer, in particular cellular rubber.

Finally proposed is an embodiment of the floor processing device in which the adjusting lever is eccentrically pivotably mounted on a wheel of the floor processing device on the one hand, and the housing on the other. In this embodiment, the adjusting lever is recurrently lifted over time relative to the surface to be processed during the rotation of the wheel, so that it can be placed onto the obstacle while the latter is being approached by the floor processing device, and lift the floor processing device, in particular its wheels, onto the obstacle. Alternatively, the adjusting lever can automatically be displaced by means of an electric motor or the like if no obstacle is determined to be present in front of the floor processing unit. For example, a control device can detect an obstacle to be overcome as a function of the detection result of a detection device and control the adjusting lever in such a way as to place it over as large a surface of the obstacle as possible.

BRIEF DESCRIPTION OF THE DRAWINGS

The invention will be explained in more detail below based on exemplary embodiments. In the drawings:

FIG. 2 is a side view of a wheel of the floor processing device with an adjusting lever arranged thereon, FIG. 3 is a bottom view under a partial area of the floor processing device with an adjusting lever according to a first embodiment, FIG. 4 is an adjusting lever according to a second embodiment, FIG. 5 is an adjusting lever according to a third embodiment, FIG. 6 is an adjusting lever according to a fourth embodiment, FIG. 7 is an adjusting lever according to a fifth embodiment, FIG. 8 is an adjusting lever according to a sixth embodiment.

DETAILED DESCRIPTION OF THE PREFERRED EMBODIMENTS

Figure 1:
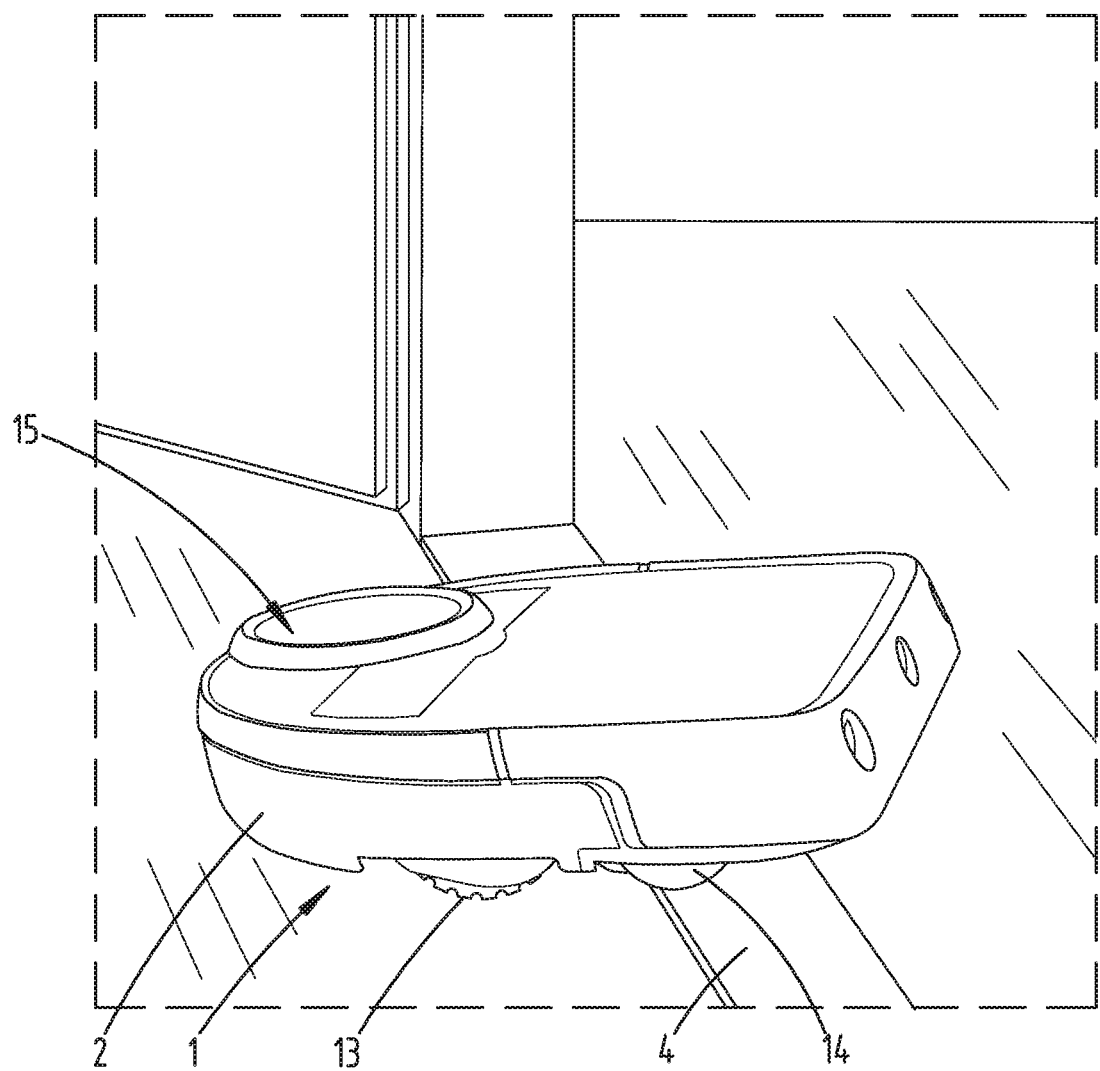
FIG. 1 is a floor processing device according to the invention in front of an obstacle to be overcome.

FIG. 1 shows an automatically moving floor processing device 1, which is here designed as a mobile cleaning robot.

The floor processing device 1 has a housing 2 and a chassis, which exhibits wheels 13 driven by an electric motor on the underside facing the surface to be processed. The chassis is flashed by the housing 2. The floor processing device 1 has a preferably electric motor-driven cleaning element 14, which is here a bristle roller for brush processing a surface. In a preferred embodiment, the cleaning element 14 penetrates through a suction mouth, which can be used to aspirate suction air by means of a motor-fan unit. The individual electrical components of the floor processing device 1 are supplied with power via a rechargeable battery (not shown in any more detail). The floor processing device 1 has a navigation and self-localization device, by means of which the floor processing device 1 can move around automatically within the environment, and determine its own location. The navigation and self-localization device has allocated to it a distance measuring device 15, which measures distances from obstacles 4 in the environment. Based on the distance data, an area map can be generated, which the floor processing device 1 uses for moving within the environment. For example, the distance measuring device 15 is here a triangulation measuring device arranged within the housing 2, which has an optical light source and an optical sensor. The light source emits light into the environment of the floor processing device 1. If necessary, this light is reflected on obstacles 4 within the environment, and at least a portion thereof gets to the sensor of the distance measuring device 15. The received measuring signals can be used to calculate a distance from the respective obstacle 4.

To allow the floor processing device 1 to overcome flat obstacles 4, for example the door threshold depicted on FIG. 1, in the traveling direction, the floor processing device 1 has an adjusting lever 3, the function of which will initially be explained in more detail with reference to FIG. 2.

FIG. 2 shows a side view of a wheel 13 of the floor processing device 1. Secured to the wheel 13 is an adjusting lever 3, which preferably is allocated to a broad side of the wheel 13 and mounted on a swivel axis 12 of the wheel 13. As usually the case, the wheel 13 has a hub 21 and spokes 20 arranged thereon. The hub 21 carries a wheel axle 16 of the wheel 13. One or two such adjusting levers 3 can be allocated to the wheel 13. The adjusting lever 3 is designed as an elongated surface part and pivotably mounted on the wheel 13 eccentrically to the wheel axle 16. The swivel axis 12 of the adjusting lever 3 is arranged on a circular line of the wheel 13 aligned concentrically to the wheel axle 16, wherein the circular line has a diameter here corresponding to one fifth to one sixth of the wheel diameter, for example. Proceeding from the swivel axis 12, the adjusting lever 3 protrudes freely toward the front in the traveling direction of the floor processing device 1. For example, this free end area measures 0.5 to 0.6 times the wheel diameter proceeding from the swivel axis 12. In the opposite direction, the adjusting lever 3 preferably extends to elongate the freely protruding end area, wherein the end area is hinged to a handlebar 17 via a connecting bearing 22 and an allocated connecting axis 18. The handlebar 17 is in turn pivotably mounted to a handlebar axis 19 on the floor processing device 1. The handlebar axis 19 preferably lies above the wheel axle 16, further preferably aligned parallel to the wheel axle 16, wherein the connecting axis 18 further preferably also runs parallel thereto between the handlebar 17 and adjusting lever.

The adjusting lever 3 is preferably driven directly by the wheel 13, wherein the free end area of the adjusting lever 3 runs on an at least approximately elliptical path. The adjusting lever 3 has a base body 5 and a contact area 6 used for purposes of support against an obstacle 4 to be overcome. The contact area 6 initially tends to point vertically downward, but further preferably extends until into a front area. The contact area 6 here preferably consists of a soft material, for example a rubbery material. The base body 5 is preferably made out of a hard plastic.

Due to the eccentric movement of the adjusting lever 3 on the wheel 13 and the oscillating mounting above the handlebar 17, the contact area 6 is guided on a nearly elliptical path, wherein the adjusting lever 3 tends to be moved upwardly toward the front given a movement of the floor processing device 1 in a usual direction of movement during a displacement of the latter from a back-displaced position into a contrastingly forward-displaced position, which further preferably takes place owing to the proposed eccentric linkage above the wheel axle 16. Once the swivel axis 12 in the area below the wheel axis 16 has been reached, the free end area of the adjusting lever 3 having the contact area 6 is tilted downwardly in the direction of the traversed surface, while the adjusting lever 3 is simultaneously pulled back into a retracted position, in which the free end area of the adjusting lever 3 preferably lies within the projection surface of the wheel 13. If no obstacle 4 is present in the path of movement of the floor processing device 1, the adjusting lever 3 does not come into contact with the traversed surface, so that the floor processing device 1 can move unimpeded. However, if a flat obstacle 4, here for example in the form of a door threshold, is arranged in the path of movement as depicted on FIG. 2, the adjusting lever 3 hits the obstacle 4 with the contact area 6. The frictional support of the contact area 6 on the obstacle 4 caused by the continued rotation of the wheel 13 results in a lifting of the wheel 13, and thus of the entire floor processing device 1. As the adjusting lever 3 continues to move, it potentially pulls the wheel toward the obstacle 4, so that the wheel 13 can drive up onto the obstacle 4 starting at a suitable lead angle.

Various embodiments of an adjusting lever 3 of the floor processing device 1 will be described in more detail below with reference to FIGS. 3 to 8.

FIG. 3 shows a first possible embodiment of an adjusting lever 3. The adjusting lever 3 has a base body 5 and a contact area 5. Arranged between the base body 5 and contact area 6 is a spring element 7, which is shaped like a wedge 24. The spring element 7 consists of an elastic material, here for example cellular rubber. The contact area 6 follows the contour of the base body 5, as well as the contour of the wedge 24, wherein the contact area 6 is shaped like an L, whose legs are at an angle greater than 90° relative to each other. The contact area 6 is not rigidly connected with the base body 5 or spring element 7, but rather can be displaced relative to the latter. The contact area 6 is connected with the base body 5 by means of a swivel arm 26 that can pivot around an axis 29. The axis 29 prescribes a force transmission line for the adjusting lever 3. The axis 29 allows a displacement of the contact area 6 relative to the base body 5 of the adjusting lever 3, which follows the pivoting movement of the adjusting lever 3 on the wheel 13. It is basically also possible to design the base body 5 and spring element or the spring element 7 and contact area 6 as an integral piece, wherein the contact area 6 is preferably configured as a spring element 7 with elastic properties, and can be applied to the contour of the base body 5 and/or obstacle 4 with a shape corresponding thereto. This basically eliminates the need for a separate spring element 7 to be arranged between the base body 5 and contact area 6. It is essential that the contact with an obstacle surface no longer be made only linearly, but rather over a larger contact surface, so as to optimize the force transmission from the adjusting lever 3 to the obstacle 4.

FIG. 4 shows another possible embodiment of an adjusting lever 3 according to the invention. This adjusting lever 3 once again has a base body 5 and a contact area 6, wherein the contact area 6 has a bristle element 9 with a carrier body 10 and bristles 11 anchored therein. In this embodiment, the bristles 11 are made out of an elastic plastic, so that the bristles 11 simultaneously represent a spring element 7 in the sense of the invention. By contrast, the carrier body 10 is made out of a rigid plastic, but can basically also comprise part of the spring element 7. The bristles 11 are here preferably inclined against the direction of movement of the floor processing device 1. The bristles 11 can further be bent following this direction of inclination, while preferably blocking in the opposite direction, however. The bristles 11 can be designed as plastic bristles with a diameter of 0.1 mm to 0.2 mm, for example. However, more stable configurations are also possible, for example in the form of plastic strips with a width of several millimeters, wherein the longitudinal side of the strips is preferably oriented transverse to the direction of movement of the floor processing device 1. It is also conceivable that the bristles 11 be combined into bristle bundles. The contact area 6 of the adjusting lever 4 is formed by the free ends of the bristles 11.

FIG. 5 shows another embodiment of an adjusting lever 3, which has a base body 5 and an articulated foot 28, which is pivotably mounted to the base body 5 via a joint axis 27. The articulated foot 28 carries a contact area 6. Two stops 25 are allocated to the articulated foot 28, and border the possible swivel angle of the articulated foot 28 around the joint axis 27. The articulated foot 28 can have allocated to it a spring element 7 (not shown), which attempts to swivel the articulated foot 28 away from the base body 5. When the articulated lever 28 loaded with the weight of the floor processing device 1 is standing on a surface or an obstacle 4, the spring element 7 is compressed against its restoring force. The contact area 6 can preferably be integrally designed with the articulated foot 28. In particular, the contact area 6 comprised of an elastic material can be injection molded onto the articulated foot 28. The elasticity of the contact area 6 increases a frictional force between the contact area 6 and the surface or obstacle 4.

FIG. 6 shows an embodiment of an adjusting lever 3 similar to the embodiment according to FIG. 4. The adjusting lever 3 according to FIG. 6 also has a bristle element 9 with a carrier body 10 and bristles 11. In this configuration, however, the bristles 11 are rigid in design, while the carrier body 10 simultaneously comprises the spring element 7. The bristles 11 are thus in an elastic carrier material, which allows a displacement of the contact area 6 consisting of the free ends of the bristles 11. The bristles 11 do not change their shape, but can rather be displaced relative to the base body 5 or adapt to an obstacle given the deformability of the carrier body 10.

Finally, FIGS. 7 and 8 show two embodiments of adjusting levers 3 that have a cushion element 8. For example, the cushion element is an air cushion or a gel cushion, but can also be made out of a solid rubber or other elastic materials that adapt to the shape of an obstacle when loaded with the weight of the floor processing device 1. In the embodiment on FIG. 7, the cushion element 8 has a contact area 6 comprised of a material that differs from the remaining partial areas of the cushion element 8. In particular, the material of the contact area 6 is elastic and resistant, while the cushion element 8 can otherwise be made out of a material more elastic than the material of the contact area 6. By contrast, FIG. 8 shows a cushion element 8 consisting of only one material component. A compromise must be reached there in terms of the material, so that the contact area 6 is resistant on the one hand, but is simultaneously also elastic on the other, so that the cushion element 8 with the contact area 6 can adapt to an obstacle 4.

| | Reference List |
|---|---|
| 1 | Floor processing device |
| 2 | Housing |
| 3 | Adjusting lever |
| 4 | Obstacle |
| 5 | Base body |
| 6 | Contact area |
| 7 | Spring element |
| 8 | Cushion element |
| 9 | Bristle element |
| 10 | Carrier body |
| 11 | Bristle |
| 12 | Swivel axis |
| 13 | Wheel |
| 14 | Cleaning element |
| 15 | Distance measuring device |
| 16 | Wheel axle |
| 17 | Handlebar |
| 18 | Connecting axis |
| 19 | Handlebar axis |
| 20 | Spoke |
| 21 | Hub |
| 22 | Connecting bearing |
| 23 | Lever bearing |
| 24 | Wedge |
| 25 | Stop |
| 26 | Swivel arm |
| 27 | Joint axis |
| 28 | Articulated foot |
| 29 | Axis |

What is claimed is:

1. An automatically moving floor processing device comprising:
   a housing,
   an adjusting lever configured to be displaced relative to the housing for overcoming an obstacle, the adjusting lever having a base body and a contact area configured for contacting the obstacle to be overcome,
   wherein the base body of the adjusting lever is mounted on a swivel axis so that the adjusting lever can eccentrically swivel on a wheel of the floor processing device and on the housing,
   wherein the adjusting lever extends in opposite directions from the swivel axis and has a free end area that carries the contact area,
   wherein the adjusting lever is hinged to a handlebar via a connecting axis at an end of the adjusting lever that is opposite from the free end area carrying the contact area,
   wherein the handlebar is in turn pivotably mounted to the housing of the floor processing device, and
   wherein the contact area is pivotably mounted on an axis of the base body so as to be displaceable relative to the base body of the adjusting lever.

2. The floor processing device according to claim 1, wherein the adjusting lever has a spring element that provides a spring force between the contact area and the base body.

3. The floor processing device according to claim 2, wherein a restoring force of the spring element is directed toward the contact area proceeding from the base body.

4. The floor processing device according to claim 2, wherein the contact area is an integral partial area of the cushion element or spring element, or is rigidly connected with the cushion element or spring element.

5. The floor processing device according to claim 2, wherein the spring element is an elastic wedge arranged between the base body and the contact area.

6. The floor processing device according to claim 1, wherein the adjusting lever has a cushion element that is configured to be deformed by a mechanical load between the contact area and the base body.

7. The floor processing device according to claim 1, wherein the contact area has a flexible material.

8. The floor processing device according to claim 1, wherein the contact area is part of a bristle element with bristles secured to a carrier body, wherein the carrier body and/or the bristles are elastic in design, and/or the carrier body is a cushion element or spring element that can be deformed under a mechanical load.

* * * * *